United States Patent Office 3,440,266
Patented Apr. 22, 1969

---

3,440,266
DISILOXANES SUBSTITUTED WITH TRIALKYL-
SILYLPHENYL SUBSTITUENTS AND REACTIVE
GROUPS
Tse C. Wu, Waterford, N.Y., assignor to General
Electric Company, a corporation of New York
No Drawing. Filed Nov. 21, 1966, Ser. No. 595,633
Int. Cl. C07f 7/08; C08g 47/04
U.S. Cl. 260—448.2                                   6 Claims This invention relates to disiloxanes substituted with trialkylsilylphenyl substituents and with reactive groups. More particularly, this invention relates to disiloxanes having the formula:

(1)       $R_xR'_yXSi—O—SiXR'_yR_x$ where R is a trialkylsilylphenyl group having a formula selected from the class consisting of:

(2) 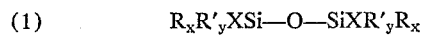

(3) 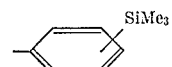

(4) 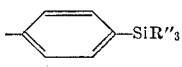

where Me is methyl, R″ is a lower alkyl radical selected from the class consisting of methyl, ethyl, and propyl, not more than two R″ groups being methyl on any given trialkylsilylphenyl group of Formulas 3 and 4; R′ is a monovalent aryl group, X is a reactive group, $x$ is an integral number of from 1 to 2, $y$ is an integral number of from 0 to 1, and the sum of $x$ and $y$ is 2.

Aryl-substituted organopolysiloxanes are known to have greater high temperature stability and radiation resistance than the corresponding alkyl-substituted organopolysiloxanes. However, phenyl-substituted organopolysiloxanes, while having the high temperature and radiation resistance properties ascribed to aryl-substituted organpolysiloxanes, are generally brittle. Chiefly, this brittleness is believed due to the symmetry of the phenyl substitution. If the symmetry is broken by the inclusion of other substituents, the compounds become more flexible. However, if these other substituents are alkyl, then the full effect of the high temperature and radiation resistance properties of the phenyl-substituted compound are not realized. If the symmetry is broken by the inclusion of another aryl substituent, not only is the compound less brittle, but, additionally, the high temperature and radiation resistance properties can be fully realized.

Cyclic organopolysiloxanes have been found particularly valuable in the formation of organopolysiloxanes, especially high molecular weight polymers. Exemplary of these cyclic organopolysiloxanes which have proven invaluable in the formation of high molecular weight organopolysiloxanes are octamethylcyclotetrasiloxane and hexaphenylcyclotrisiloxane. In the production of octamethylcyclotetrasiloxane certain hydrolysis and distillation procedures produce acceptable quantities of this cyclic material. However, in organopolysiloxanes having more complex substituents, direct chemical reaction to form the material is generally necessary. This is especially true where each of the silicon atoms in the cyclopolysiloxane does not have the same substituents. In these situations, it is required that a difunctional organodisiloxane be reacted with a difunctional organosilane, at least some of the organo groups being the more complex substituents. This has proved true with organosilicon materials substituted with trialkylsilylphenyl substituents.

In the prior art, controlled hydrolyses of organochlorosilanes have produced acceptable yields of the corresponding difunctional organodisiloxanes. However, such techniques have not proved useful in the formation of difunctional organodisiloxanes where at least some of the substituents are trialkylsilylphenyl substituents. The controlled hydrolyses methods have resulted in a small percentage of the desired disiloxane in combination with a variety of by-products. Since the cyclotrisiloxane to be formed into the high molecular weight polymers must be extremely pure, such low yields in combination with by-products are not acceptable. In accordance with the present invention these difunctional organodisiloxanes substituted with trialkylsilylphenyl groups have been produced in acceptable yields with high purity. It is, therefore, an object of this invention to provide difunctional organodisiloxanes substituted with trialkylsilylphenyl substituents, as described in Formula 1.

As previously mentioned, a diorganodichlorosilane will ordinarily undergo partial hydrolysis, with limited amounts of water, to form the corresponding dimer dichloride, or difunctional organodisiloxane. However, when such a hydrolysis was attempted with a trialkylsilylphenyl-substituted organochlorosilane, in particular bis(m-trimethylsilylphenyl)dichlorosilane, the major products obtained were the starting material and the cyclic trimer, hexakis-(m-trimethylsilylphenyl)cyclotrisiloxane. Only an 8 percent yield of the desired sym-dichlorotetrakis(m-trimethylsilylphenyl)disiloxane was obtained, along with 46 percent of the original starting dichlorosilane and 30 percent of the cyclotrisiloxane. Similarly, carrying out the hydrolysis in the presence of pyridine or with zinc oxide in the presence of methyl acetate, large quantities of the cyclic trimer were produced without any significant amounts of the desired disiloxane. This was particularly surprising in view of the fact that employing similar materials, such as, ditolyldichlorosilane and bis(m - trifluoromethylphenyl)-dichlorosilane, reasonable yields of the desired dichlorotetraorganodisiloxane were obtained. Employing the para-isomer of the previously mentioned trialkylsilylphenylchlorosilane, namely, bis(p-trimethylsilylphenyl)dichlorosilane, a large yield of the cyclic trimer again resulted with very little of the dimer dichloride. This direct production of the cyclic trimer is, however, not suitable for the product of mixed cyclic trimers, that is, those with differing organic substituents on the various silicon atoms. Further, the direct production is not suitable as a commercial process for the formation of the symmetrical cyclic trimers as the material cannot be obtained with sufficient purity in sufficiently high yields.

In accordance with the present invention it has been found that difunctional trialkylsilylphenyl-substituted disiloxanes can be produced by a hydrolysis involving a diorganochlorosilane, wherein at least one of the organo groups is a trialkylsilylphenyl substituent. The result of this hydrolysis is a sym-tetraorganodisiloxane with a hydrogen substituent on each of the silicon atoms. If the corresponding dichloro or dibromo compound is desired, the dihydrogen substituted material can be reacted with an N-halosuccinimide. Further, if the corresponding dihydroxy substituted disiloxane is desired, the dihalo-substituted disiloxane can be subjected to a neutral hydrolysis. The formation of the dihydrogen-substituted disiloxane and the dihalo-substituted disiloxane are shown below in Equations 5 and 6:

(5)
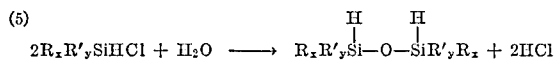

(6)
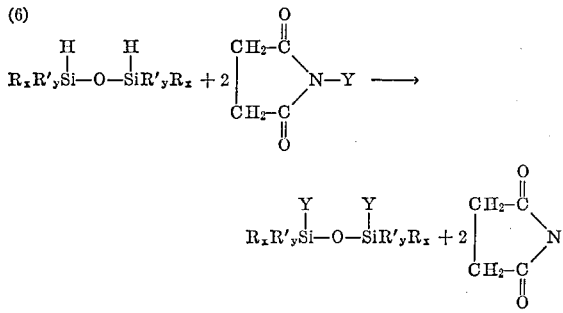

where R, R', x and y are as previously defined, and Y is selected from the class consisting of bromine and chlorine. The product of Equation 5 corresponds to Formula 1 where X is hydrogen; similarly, the product of Equation 6 corresponds to Formula 1 where X is bromine or chlorine.

The hydrolysis reaction represented by Equation 5 is conducted in the absence of a solvent. Because only one substituent on the silicon atom is hydrolyzable, it is not necessary that the reactants be diluted for reaction nor is the order of addition critical, as it would be in a partial hydrolysis. Any amount of water can be employed from the theoretical stoichiometric requirements up, keeping in mind only, for an upper limit, the problems of subsequent recovery. No catalyst or acid acceptor is necessary. The reaction can be carried out at any temperature from ambient temperature up to the decomposition point of the formed disiloxane and, preferably, the temperature is not above 50° C. While the reaction is essentially instantaneous, the mixture should be stirred for from about 15 minutes to 1 hour after completion of additions in order to assure completion of the reaction.

Following this stirring, the reaction mixture is extracted with ether or aromatic hydrocarbons and the resultant solution is washed with water to remove the hydrogen chloride generated in the reaction. This solution is then dried with a drying agent, such as sodium sulfate, the drying agent is removed by filtration, and the solvent is evaporated from the filtrate. The residue is purified by fractional distillation and is then recrystallized employing acetonitrile, or other low boiling solvent which is non-reactive toward the hydrogen-substituted disiloxane.

The reaction of the hydrogen substituted disiloxane with the N-halosuccinimide is carried out in the presence of solvent, with a low concentration of reactants. Among the preferred solvents is carbon tetrachloride, but any halogenated hydrocarbon solvent can be employed. While the order of addition of the reactants is not critical, preferably, the N-halosuccinimide is added to the disiloxane dissolved in the solvent because of the nature of the hydrogen compound. The disiloxane is preferably contained in the solvent in an amount of from 0.1 to 1.0 mole per liter. The reaction is exothermic and the temperature of the reaction mixture is gradually raised to reflux, which is the preferable temperature of reaction. However, sufficient heat is generated that the rate of addition must be limited in order to control the temperature of the reaction mixture. Preferably, as the batch size is increased, the time of addition is increased. Following completion of addition, from about 1 to 6 hours or more should be allowed in order to assure completion of the reaction. The solids formed in the reaction mixture are filtered off, the solvent evaporated from the filtrate, and the desired sym-tetraorganodihalodisiloxane is recovered from the reaction mixture by fractional distillation.

When it is desired to form the dihydroxy substituted disiloxane, the dihalogen substituted disiloxane is treated with a small amount of water in a solvent in the presence of a neutralizing agent, such as sodium bicarbonate. A very dilute solution is employed, in combination with the neutralizing agent, in order to prevent condensation of the disiloxane by the reaction by-products, following formation of the hydroxyl group. Preferably, the dihalo-substituted disiloxane is added slowly to a solution containing the water and sodium bicarbonate and the mixture is then stirred for an additional ½ to 3 hours to assure completion of the reaction. The solids are filtered from the reaction mixture, the filtrate evaporated, and the residue recrystallized from a hydrocarbon solvent, such as pentane, to yield the desired product.

The following examples are given for the purposes of illustration and should not be considered as limiting in any way the full scope of the invention as covered in the appended claims. All parts in these examples are by weight.

EXAMPLE 1

This example illustrates the preparation of 1,1,3,3-tetrakis(m-trimethylsilylphenyl)disiloxane. A quantity of bis(m-trimethylsilylphenyl)chlorosilane was prepared as described and claimed in my copending application Ser. No. 595,625, filed of even date herewith and assigned to the same assignee as the present invention.

A quantity of 1000 parts of water was placed in a reaction vessel and to it was added 141.9 parts of the bis (m-trimethylsilylphenyl)chlorosilane, while stirring vigorously. On completion of the addition, the hydrolysis mixture was stirred for another 30 minutes after which a quantity of 425 parts of ethyl ether was added, and mixed into the hydrolysis mixture. The aqueous layer, which formed after stirring was discontinued, was washed with ether and the ether washes were mixed with the originally formed ether solution and washed three times with water. The resulting ether solution was dried over sodium sulfate, filtered, and the ether distilled to yield 121.4 parts of a solid residue melting at 43–51° C. This residue was fractionally distilled in a vacuum and the portion boiling at 200–260° C. at 0.04 mm. was collected. The material was recrystallized three times from acetonitrile and yielded 86 parts of crystals melting at 53.5–55° C. This quantity was equivalent to a 65 percent yield, based on the theoretical, of the material having the structure:

(7)
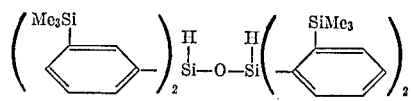

This corresponds with the material of Formula 1 where $x$ is 2, $y$ is 0, R is as shown in Formula 2 with the trimethylsilyl group in the meta position, and X is hydrogen. An infrared spectrum of the material substantiated this structure.

EXAMPLE 2

In this example the preparation of 1,3-dibromo-1,1,3,3-tetrakis(m-trimethylsilylphenyl)disiloxane is illustrated. A solution of 80.5 parts of 1,1,3,3-tetrakis(m-trimethylsilylphenyl)disiloxane, as produced in Example 1, in 560 parts of carbon tetrachloride was placed into a reaction vessel equipped with a stirrer, condenser, and gas-inlet tube. To this solution was added 47 parts of N-bromosuccinimide, representing a 10 percent excess over the stoichiometric requirement, in small portions, with stirring. The exothermic nature of the reaction caused a slight refluxing of the solution after about 30 minutes. On completion of the reaction, the now orange reaction mixture was stirred, at room temperature, for a period of about 5 hours and was then allowed to stand for a few hours. The solids which formed on standing were removed by filtration and the filtrate was evaporated in a rotary evaporator to remove the solvent. The resulting residue was a solid melting at 72–79° C. This residue was vacuum distilled to yield 77.8 parts of a distillate boiling at 246–250° C. at a pressure of 0.02 mm. This product was found to have a melting point of 78–82° C. The 77.8 part yield represented 78 percent of the theoretical for the product having the formula:

(8) 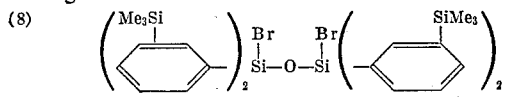

This product corresponds to that shown in Formula 1 where $x$ is 2, $y$ is 0, R is as shown in Formula 2 where the trimethylsilyl group is in the meta position, and X is bromine. The bromine content of the product was found to be 19.26 percent, corresponding very favorably with the theoretical percentage of 19.27 percent.

EXAMPLE 3

This example illustrates the preparation of 1,3-dihydroxy-1,1,3,3 - tetrakis(m-trimethylsilylphenyl)disiloxane. A mixture of 10 parts of sodium bicarbonate, 70 parts of ethyl ether, and 2 parts of water was placed into a reaction vessel. To the mixture was added 8.3 parts of 1,3-dibromo-1,1,3,3 - tetrakis(m-trimethylsilylphenyl)disiloxane dissolved in 35 parts of ethyl ether. The addition was carried out over a period of about 30 minutes, at room temperature, with stirring. The reaction mixture was stirred for an additional hour and then allowed to stand for several hours. The solids which formed were filtered off and the filtrate was evaporated to remove the solvent. The resulting residue was dissolved in pentane and cooled to 0° C. A quantity of 0.8 part of granular crystals were obtained from the pentane solution and melted at 85–88° C. An additional quantity of less pure product, melting at 80–86° C. was obtained from the mother liquor. The product had the formula:

(9) 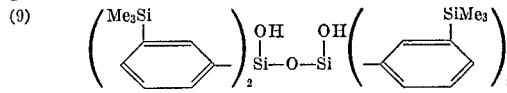

which was substantiated by an infrared spectrum. This product corresponds to Formula 1 where $x$ is 2, $y$ is 0, R is as shown in Formula 2 with the trimethylsilyl group in the meta position, and X is hydroxyl.

EXAMPLES 4–6

Employing essentially the same procedure as used in Example 1, but with chlorosilanes as indicated, the following disiloxanes are produced:

The reaction is somewhat slower, due to the more limited reactivity of the N-chlorosuccinimide, as compared with that of N-bromosuccinimide. This compound can be treated as shown in Example 3 to produce the corresponding dihydroxy disiloxane.

The compounds produced according to the present invention are useful in forming cyclotrisiloxanes containing the trialkylsilylphenyl substituent, as more fully described and claimed in my copending application Ser. No. 595,631, filed of even date herewith and assigned to the same assignee as the present invention. Thus, the sym-dibromodisiloxane can be reacted with diorganosilanediols, or the sym-dihydroxydisiloxane can be reacted with diorgandodihalosilanes to produce the corresponding cyclotrisiloxanes substituted with trialkylsilylphenyl substituents. The production of the sym-difunctional disiloxanes are, as previously pointed out, essential to the preparation of such cyclotrisiloxanes for use in the preparation of high molecular weight polymers. The high molecular weight polymers, as more distinctly pointed out in my copending application Ser. No. 595,632, now U.S. Patent 3,385,821, filed of even date herewith and assigned to the same assignee as the present invention, have extremely high thermal stabilities, essentially equivalent to those of polytetrafluoroethylene in contradistinction to the thermal stabilities of most other organopolysiloxanes.

What I claim as new and desire to secure by Letters Patent of the United States is:

1. A compound of the formula:

$$R_xR'_yXSi-O-SiXR'_yR_x$$

where R is a trialkylsilylphenyl substituent having a formula selected from the class consisting of:

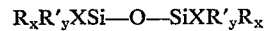

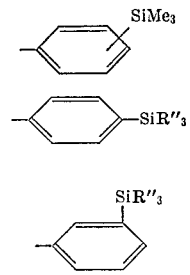

and

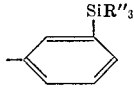

where Me is methyl, R″ is a lower alkyl group selected from the class consisting of methyl, ethyl, and propyl, no

| Example | Chlorosilane | Disiloxane | |
|---|---|---|---|
| 4 | <image showing SiMe₃-C₆H₄-SiPhHCl> | <image showing disiloxane with SiMe₃, H, Ph substituents> | (11) |
| 5 | <image showing (SiEt₃-C₆H₄-)₂SiHCl> | <image showing disiloxane with SiEt₃, H substituents> | (12) |
| 6 | <image showing Pr₃Si-C₆H₄-SiTHCl> | <image showing disiloxane with Pr₃Si, H, T substituents> | (13) | where T is tolyl, Et is ethyl, Pr is propyl and Ph is phenyl.

EXAMPLE 7

Employing the general procedure used in Example 2, the disiloxane of Example 5, as indicated by Formula 12, is reacted with N-chlorosuccinimide to produce a product having the formula:

(14) 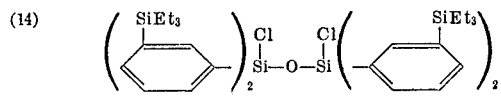

more than two R″ substituents being methyl on any given trialkylsilylphenyl group; R′ is a monovalent aryl group: X is a reactive substituent selected from the class consisting of hydrogen, bromine, chlorine, and hydroxyl; $x$ is a number from 1 to 2, $y$ is a number from 0 to 1, and the sum of $x$ and $y$ is 2.

2. The compound of claim 1 having the formula:

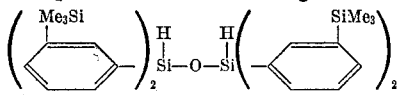

where Me is methyl.

3. The compound of claim 1 having the formula:

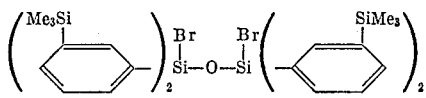

where Me is methyl.

4. The compound of claim 1 having the formula:

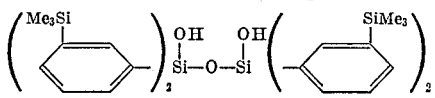

where Me is methyl.

5. A method for producing the compound of claim 1, where X is hydrogen, which comprises hydrolyzing a compound having the formula:

$$R_xR'_ySiHCl$$

where R, R', x, and y are as previously defined.

6. A method for forming the compound of claim 1 wherein X is selected from the class consisting of bromine and chlorine, which comprises hydrolyzing a compound having the formula:

$$R_xR'_ySiHCl$$

where R, R', x and y are as previously defined, and thereafter reacting the product with a material selected from the class consisting of N-bromosuccinimide and N-chlorosuccinimide.

References Cited

UNITED STATES PATENTS 3,053,872  9/1962  Omietanski.
3,385,821  5/1968  Wu _____ 260—448.2 XR TOBIAS E. LEVOW, *Primary Examiner.*

P. F. SHAVER, *Assistant Examiner.*

U.S. Cl. X.R.

260—46.5